US007649526B2

(12) United States Patent
Ording et al.

(10) Patent No.: US 7,649,526 B2
(45) Date of Patent: Jan. 19, 2010

(54) SOFT KEY INTERACTION INDICATOR

(75) Inventors: Bas Ording, San Francisco, CA (US);
Imran Chaudhri, San Francisco, CA (US); Marcel Van Os, San Francisco, CA (US); Stephen O. Lemay, San Francisco, CA (US); Freddy Allen Anzures, San Francisco, CA (US); Greg Christie, San Jose, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 626 days.

(21) Appl. No.: 11/322,548

(22) Filed: Dec. 23, 2005

(65) Prior Publication Data

US 2007/0146336 A1   Jun. 28, 2007

(51) Int. Cl.
*G06F 3/041* (2006.01)
(52) U.S. Cl. ...................................... 345/173; 715/700
(58) Field of Classification Search ......... 385/173–179; 178/18.01–18.11, 19.01–19.07; 715/700
See application file for complete search history.

(56) References Cited

U.S. PATENT DOCUMENTS

| 4,334,219 | A |   | 6/1982  | Paülus et al. ............... 340/713 |
|-----------|---|---|---------|--------------------------------------|
| 4,504,133 | A |   | 3/1985  | Nakai et al. ................ 354/266 |
| 4,812,831 | A |   | 3/1989  | Laier ........................ 340/711 |
| 5,053,758 | A |   | 10/1991 | Cornett et al. .............. 340/712 |
| 5,205,637 | A |   | 4/1993  | Caspari ..................... 362/109 |
| 5,266,949 | A |   | 11/1993 | Rossi ......................... 341/22 |
| 5,278,362 | A |   | 1/1994  | Ohashi ....................... 200/5 A |
| 5,523,774 | A |   | 6/1996  | Schwartz ................... 345/168 |
| 5,605,406 | A |   | 2/1997  | Bowen ....................... 400/472 |
| 5,612,719 | A |   | 3/1997  | Beernink et al. ........... 345/173 |
| 5,687,331 | A | * | 11/1997 | Volk et al. ................. 715/840 |
| 5,736,974 | A |   | 4/1998  | Selker ....................... 345/146 |
| 5,825,352 | A |   | 10/1998 | Bisset et al. ............... 345/173 |
| 5,828,948 | A |   | 10/1998 | Almgren et al. ........... 455/34.1 |
| 5,872,559 | A |   | 2/1999  | Shieh ........................ 345/157 |
| 5,939,134 | A |   | 8/1999  | McKean et al. ............ 427/127 |
| 5,943,043 | A |   | 8/1999  | Furuhata et al. ........... 345/173 |
| 6,046,730 | A |   | 4/2000  | Bowen et al. .............. 345/168 |

(Continued)

FOREIGN PATENT DOCUMENTS

GB    2 337 349 A    11/1999

(Continued)

OTHER PUBLICATIONS

Invitation to Pay Additional Fees for International application No. PCT/US2007/060119 (related case), dated Jan. 2, 2008.

(Continued)

*Primary Examiner*—Alexander Eisen
*Assistant Examiner*—Kenneth B Lee, Jr.
(74) *Attorney, Agent, or Firm*—Morgan, Lewis & Bockius LLP (57) ABSTRACT

An indication of interaction with a touch-sensitive display is provided. A soft key is displayed on the touch-sensitive display. Contact with the touch-sensitive display corresponding to interaction with the soft key is detected. The periphery of the soft key smoothly changes in optical intensity in response to detecting the contact.

12 Claims, 7 Drawing Sheets

U.S. PATENT DOCUMENTS

| | | | | |
|---|---|---|---|---|
| 6,073,036 | A | 6/2000 | Heikkinen et al. | 455/575 |
| 6,137,427 | A | 10/2000 | Binstead | 341/33 |
| 6,211,858 | B1 | 4/2001 | Moon et al. | 345/146 |
| 6,310,609 | B1 | 10/2001 | Morgenthaler | 345/170 |
| 6,323,846 | B1 | 11/2001 | Westerman et al. | 345/173 |
| 6,498,600 | B1 | 12/2002 | Vance et al. | 345/168 |
| 6,570,557 | B1 | 5/2003 | Westerman et al. | 345/173 |
| 6,677,932 | B1 | 1/2004 | Westerman | 345/173 |
| 6,825,861 | B2 | 11/2004 | Wasko et al. | 345/861 |
| 6,906,701 | B1 | 6/2005 | Oueslati et al. | 345/170 |
| 6,924,789 | B2 | 8/2005 | Bick | 345/168 |
| 6,926,609 | B2 | 8/2005 | Martin | 463/36 |
| 6,930,671 | B2 | 8/2005 | Choi | 345/169 |
| 6,959,208 | B2 | 10/2005 | Tanaka et al. | 455/567 |
| 7,355,606 | B2 | 4/2008 | Paquette | 345/589 |
| 2002/0015024 | A1 | 2/2002 | Westerman et al. | 345/173 |
| 2004/0160419 | A1* | 8/2004 | Padgitt | 345/173 |
| 2005/0285965 | A1 | 12/2005 | Zimmer et al. | 348/333.11 |
| 2006/0226790 | A1 | 10/2006 | Prouse | 315/291 |
| 2007/0162298 | A1 | 7/2007 | Melton et al. | 705/1 |
| 2008/0224988 | A1 | 9/2008 | Whang | 345/102 |

FOREIGN PATENT DOCUMENTS

| | | | |
|---|---|---|---|
| JP | 05189110 A | | 7/1993 |
| JP | 06004214 A | * | 1/1994 |
| WO | WO 98/33111 A1 | | 7/1998 |
| WO | WO 2004/051392 A2 | | 6/2004 |

OTHER PUBLICATIONS

International Search Report and Written Opinion for International Application No. PCT/US2006/061630, mailed Jan. 31, 2008.

Ballard, B., et al., "HDML Style Guide for the Sprint PCS Wireless Web Browser," Sprint Spectrum, LP, Ver. 3.0, Oct. 2000.

Jaguar Cars Ltd., "2002.5 MY Audio System Handbook with Touchscreen," Nov. 2001.

Multimedia Soft, "3D Control Magic for .Net," http://www.multimediasoft.com/3dcm/, printed Dec. 1, 2005.

Java Technology Products: Download, "Personal Java Application Environment,", htpp://java.sum.com/jsp_utils/PrintPage.jsp?url=htpp%3A%2F%2Fjava.sun.com%2Fproduc..., printed Apr. 13, 2006, 12 pages.

Jazzmutant, "Jazzmutant Lemur," http://64.233.167.104/search?q=cache:3g4wFSaZiXIJ:www.nuloop.c, printed Nov. 16, 2005, 3 pages.

Jazzmutant, "The Lemur: Multitouch Control Surface,"http://64233.167.104/search?q=cache:j0_nFbNVzOcJ:www.cycling7, printed Nov. 16, 2005, 3 pages.

Miller, D., "Personal Java Application Environment," http://java.sun.com/jsp_utils/PrintPage.jsp?url=http%3a%2f%2fjava.sun.com%2produc..., Jun. 8, 1999.

* cited by examiner

SOFT KEY INTERACTION INDICATOR

TECHNICAL FIELD

The disclosed embodiments relate generally to user interfaces that employ touch-sensitive displays. More particularly, the disclosed embodiments relate to changing the optical intensity of the periphery of a soft key in response to interaction with the soft key.

BACKGROUND

Touch-sensitive displays (also known as "touch screens" or "touchscreens") are well known in the art. Touch screens are used in many electronic devices to display graphics and text, and to provide an interface through which a user may interact with the devices. For example, touch screens may receive user actions or behaviors, including user attempts to access a device's features or tools. In particular, touch screens are designed to detect and respond to contact on the touch screen and movement of the point of contact on the touch screen. A device may display one or more soft keys, menus and/or other user-interface objects on the touch screen. A user may interact with the device by contacting the touch screen at locations corresponding to the user-interface objects with which he or she wishes to interact.

One challenge with touch screens is to provide sensory feedback to a user such that the user has the perception that he or she is actively interacting with a user-interface object, such as a soft key. In devices with physical buttons, the user gets a tactile sensation from pushing a physical button. However, sensory feedback that is suitable for physical buttons may not be suitable for soft keys on touch screens. The user may not perceive a tactile sensation with a soft key since the touch screen on which the soft key is displayed is often flat.

Accordingly, there is a need for improved techniques for providing users with an indication of interaction with soft keys.

SUMMARY

An indication of interaction with a device including a touch-sensitive display is provided. A soft key is displayed on the touch-sensitive display. Contact with the touch-sensitive display corresponding to interaction with the soft key is determined. An optical intensity of a periphery of the soft key is changed in response to detecting the contact.

The optical intensity may be changed smoothly. In some embodiments, smoothly may include changing the optical intensity according to a periodic function. The periodic function may correspond to increasing and decreasing the optical intensity.

The periphery of the soft key may include a band or annular region surrounding the soft key.

In some embodiments, a release of the contact is determined and the optical intensity is smoothly decreased.

The aforementioned methods may be performed by a portable electronic device having a touch-sensitive display with a graphical user interface (GUI), one or more processors, memory and one or more modules, programs or sets of instructions stored in the memory for performing these methods. In some embodiments, the portable electronic device provides a plurality of functions, including wireless communication.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

In the embodiments described below, a soft key is displayed on the touch-sensitive display. In response to determining contact with the touch-sensitive display corresponding to interaction with the soft key, an optical intensity of a periphery of the soft key is changed. The periphery of the soft key may include a band or annular region surrounding the soft key. The optical intensity may be changed smoothly, including increasing and/or decreasing the optical intensity. The optical intensity may be changed according to a periodic function. The periodic function may have a maximum frequency that is less than a pre-determined value. The maximum frequency may be an order of magnitude (at least 10-100x) slower than the touch-sensitive display is capable of changing or modifying a displayed optical intensity. The pre-determined value may be from 0.25 to 2.5 Hz. In some embodiments, the periodic change in optical intensity may be maintained until a breaking of contact occurs or a subsequent contact occurs after an original contact is broken. In some embodiments, the optical intensity is smoothly decreased if a release of, i.e., a breaking of, the contact is determined.

Figure 1:
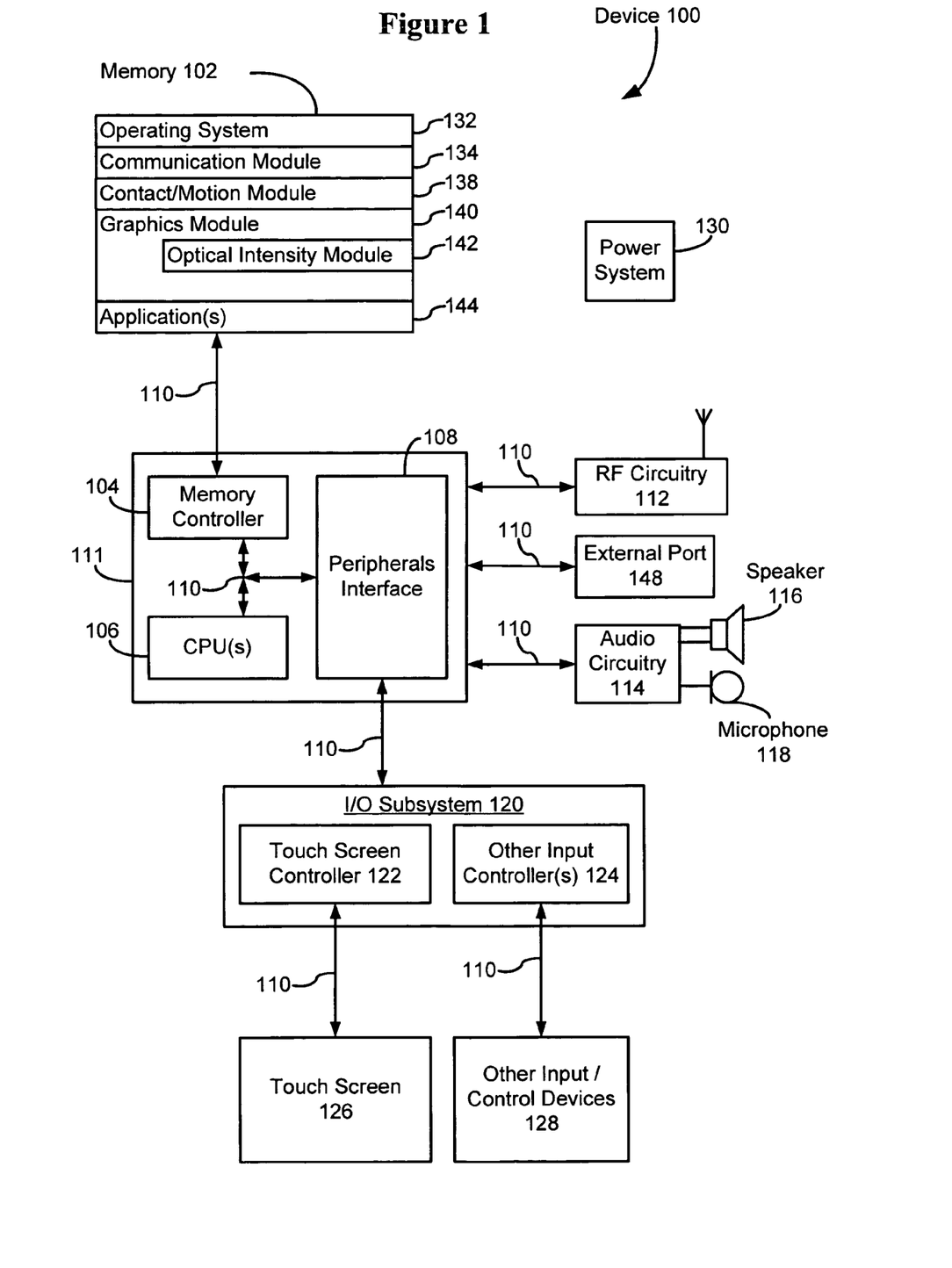
FIG. 1 illustrates a block diagram of a portable electronic device, according to some embodiments of the invention.

FIG. 1 illustrates a block diagram of a portable electronic device, according to some embodiments of the invention. The device 100 includes a memory 102, a memory controller 104, one or more processing units (CPUs) 106, a peripherals interface 108, one or more buses 110, RF circuitry 112, audio circuitry 114, a speaker 116, a microphone 118, an input/output (I/O) subsystem 120, a touch screen 126, other input or control devices 128, and an external port 148. These components communicate over the one or more buses 110, which may include a combination of data lines, address lines, and control signals. The device 100 can be any portable electronic device, including but not limited to a handheld computer, a tablet computer, a mobile phone, a media player, a personal digital assistant (PDA) and the like, including a combination of two or more of these items. It should be appreciated that the device 100 is only one example of a portable electronic device 100, and that the device 100 could have more or fewer components than shown, or a different configuration of components. The various components shown in FIG. 1 can be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends radio frequency electromagnetic waves. The RF circuitry 112 converts electrical signals to/from electromagnetic waves and communicates with communications networks and other communications devices via the waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards and technologies that are well known in the art, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or a short message service (SMS), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, convert the audio data to an electrical signal, and transmit the electrical signal to the speaker 116. The speaker 116 converts the electrical signal to human-audible sound waves. The audio circuitry 114 also receives electrical signals converted by the microphone 116 from sound waves. The audio circuitry 114 converts the electrical signal to audio data and transmits the audio data to the peripherals interface 108 for processing. Audio data may be retrieved from and/or transmitted to the memory 102 and/or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The I/O subsystem 120 provides the interface between input/output peripherals on the device 100, such as the touch screen 126 and other input/control devices 128, and the peripherals interface 108. The I/O subsystem 120 includes a touch screen controller 122 and one or more input controllers 124 for other input or control devices. The one or more input controllers 124 receives/sends electrical signals from/to other input or control devices 128. The other input/control devices 128 may include physical buttons (e.g., push buttons, rocker buttons, etc.), dials, slider switches, sticks, touch pads, and so forth.

The touch screen 126 provides both an output interface and an input interface between the device and a user. The touch screen controller 122 receives/sends electrical signals from/to the touch screen 126. The touch screen 126 displays visual output to the user. The visual output may include text, graphics, video, or any combination thereof. Some or all of the visual output may correspond to user-interface objects, further details of which are described below.

The touch screen 126 may also accept input from the user based on haptic and/or tactile contact. The touch screen 126 forms a touch-sensitive surface that accepts user input. The touch screen 126 and the touch screen controller 122 (along with any associated modules and/or sets of instructions in the memory 102) detects contact (and any movement or release of the contact) on the touch screen 126 and converts the detected contact into interaction with user-interface objects, such as one or more soft keys, that are displayed on the touch screen when the contact occurred. In an exemplary embodiment, a point of contact between the touch screen 126 and the user corresponds to one or more digits of the user. The touch screen 126 may use LCD (liquid crystal display) technology, or LPD (light emitting polymer display) technology, although other display technologies may be used in other embodiments. The touch screen 126 and touch screen controller 122 may detect contact and any movement or release thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. The touch-sensitive display may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, the touch-sensitive display displays visual output from the portable device, whereas touch sensitive tablets do not provide visual output. The touch screen 126 may have a resolution in excess of 100 dpi. In an exemplary embodiment, the touch screen 126 may have a resolution of approximately 168 dpi. The user may make contact with the touch screen 126 using any suitable object or appendage, such as a stylus, pen, finger, and so forth.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system 132, a communication module (or set of instructions) 134, a contact/motion module (or set of instructions) 138, a graphics module (or set of instructions) 140 and one or more applications (or set of instructions) 144.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/motion module 138 detects contact with the touch screen 126, in conjunction with the touch screen controller 122. The contact/motion module 138 includes various software components for performing various operations related to detection of contact with the touch screen 122, such as determining if contact has occurred, determining if there is movement of the contact and tracking the movement across the touch screen, and determining if the contact has been released (i.e., if the contact has been broken).

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

In some embodiments, the graphics module 140 includes an optical intensity module 142. The optical intensity module 142 controls the optical intensity of graphical objects, such as user-interface objects, displayed on the touch screen 126. Controlling the optical intensity may include increasing or decreasing the optical intensity of a graphical object. In some embodiments, the increase or decrease may follow predefined functions, further details of which are described below.

The one or more applications 144 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 100 may include the functionality of an MP3 player, such as an iPod (trademark of Apple Computer, Inc.). The device 100 may, therefore, include a 36-pin connector that is compatible with the iPod. In some embodiments, the device 100 may include one or more optional optical sensors (not shown), such as CMOS or CCD image sensors, for imaging applications.

Figure 2:
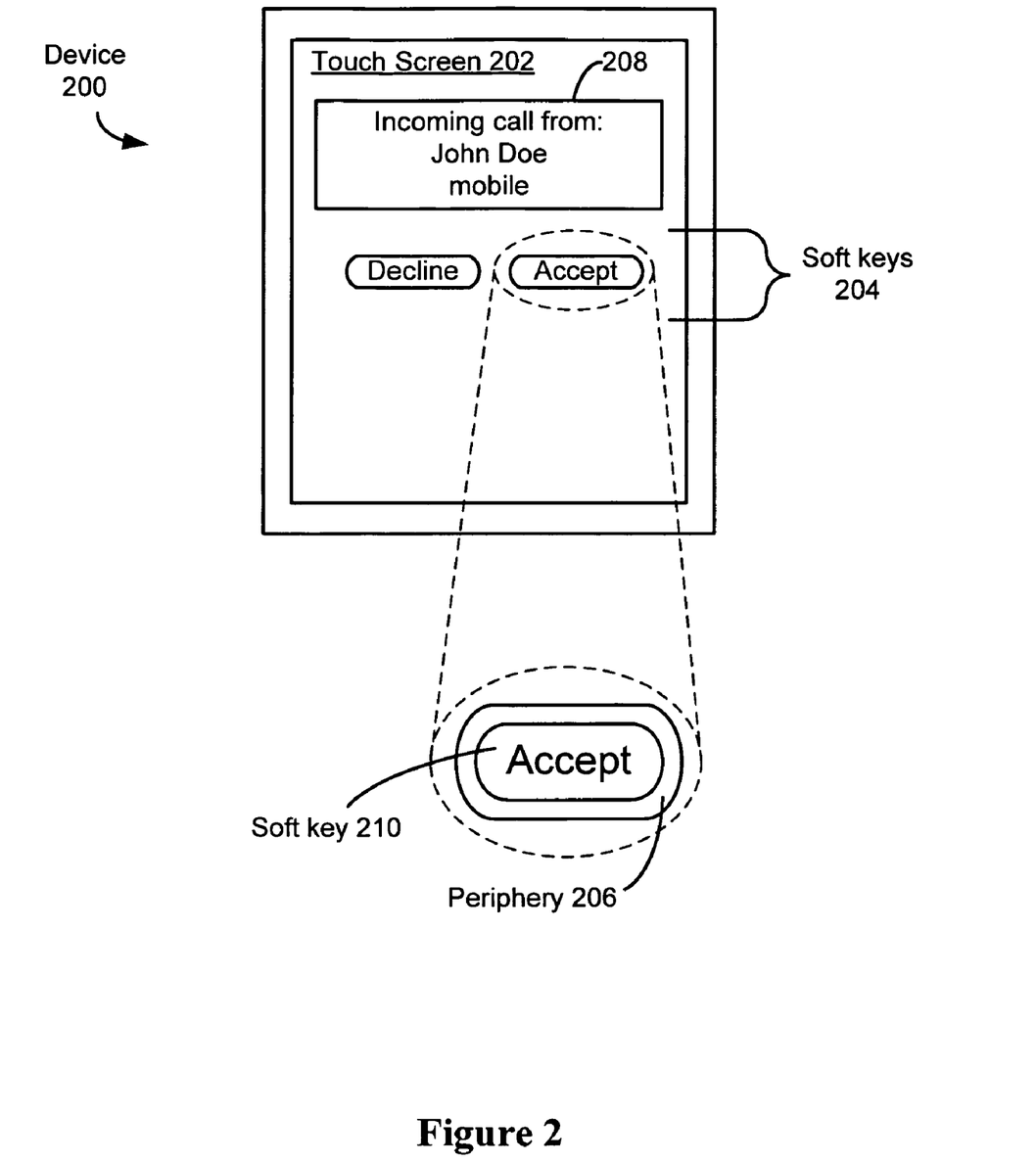
FIG. 2 illustrates a touch screen displaying one or more soft keys, according to some embodiments of the invention.

FIG. 2 illustrates a touch screen displaying one or more soft keys, according to some embodiments of the invention. In FIG. 2, device 200 includes a touch screen 202. On the touch screen 202, the device 200 may display one or more user-interface objects. The user-interface objects are objects, displayed on the touch screen 202, corresponding to the user interface of the device 200. The user-interface objects include non-interactive objects that may convey information and/or contribute to the look and feel of the user interface, and interactive objects that convey information, contribute to the look and feel of the user interface, and/or activate or deactivate a device function upon interaction with the user. The user interacts with the interactive user-interface objects by making, moving, and/or releasing (i.e., breaking) contact with the touch screen at locations on the touch screen corresponding to the areas of the objects with which he or she wishes to interact. Examples of user-interface objects include, without limitation, soft keys (also called "soft buttons" or "virtual buttons"), pull-down menus, scroll bars, icons, radio buttons, check boxes, text boxes, cursors, and so forth. In FIG. 2, a text box 208 and one or more soft keys 204 are displayed on the touch screen 202.

One or more soft keys 204 may be displayed on the touch screen 202. In some embodiments, a soft key is a user-interface object that is a virtual representation of a physical push button. Interaction with the soft key by touching the touch screen at the area of the soft key ("pushing" the soft key) activates and deactivates functions on the device 200, just as pushing a physical push button activates or deactivates functions on a device. FIG. 2 also shows a magnified view of a soft key 210. The soft key 210 includes a periphery 206. In some embodiments, the periphery 206 is a band or an annular region surrounding the soft key 210. The periphery 206 may be of any suitable width. In some embodiments, the width of the periphery 206 may be predefined based on the size of the particular soft key 210 around which the periphery 206 surrounds and optionally also of the size of the touch screen 202. The predefined width may be based on a size of one or more digits that may contact the soft key 210 and/or a contact area of the one or more digits. In some embodiments, the periphery 206 is not continuous, i.e., there may be breaks around the perimeter of the soft key 210.

The default state of the periphery 206 is that it is not perceptible to the user. That is, the default optical intensity of the periphery is at a minimum or is equivalent to a background on the touch screen 202. However, the device 200 may change the optical intensity of the periphery 206 toward a larger value and/or its maximum, at which point the periphery 206 is more perceptible to the user. The device 200 may also change the optical intensity in reverse, making the periphery 206 less perceptible to the user.

The optical intensity of the periphery 206 is the visual differentiation between the periphery on the one hand, and the background of the touch screen 202 and the corresponding soft key 210 on the other. The optical intensity, in some embodiments, may be a measured along scale between a predefined minimum and a predefined maximum. In some embodiments, the minimum optical intensity means that the periphery blends in with the background or the soft key 210 and is indistinguishable from the background or the soft key 210 (i.e., the periphery is not perceptible to the user as an object distinct from the soft key 210 and the background, hereinafter described as imperceptible to the user). In some embodiments, the maximum optical intensity means that the there is a high visual differentiation between the periphery 206 and the background or the soft key 210 (i.e., periphery 206 is perceptible to the user as an object distinct from the soft key 210 and the background). The visual differentiation may be based on differences in color, hue, color saturation, brightness, contrast, or any combination thereof. For example, in some embodiments, a soft key periphery 206 at minimum optical intensity may be perceived as a dark, black emptiness that is indistinguishable from the background, while the periphery 206 at maximum optical intensity may be perceived as a bright, white, glowing "halo" around the soft key. Animations (e.g., circling patterns or color changes over time) in the periphery can also be used to differentiate the periphery from the soft key and the background.

In some embodiments, the soft key 210 itself may change optical intensity in response to interaction as well. For example, if the soft key 210 is pushed and/or held (push the soft key 210 and maintain the contact by holding the digit in place), the soft key may darken by a predefined degree to indicate that it was pushed and/or being held. As another example, the look of the soft key 210 may be changed give an impression that its depth has changed in response to the interaction. In some other embodiments, the soft key 210 itself does not change optical intensity in response to interaction. The optical intensity of the periphery 206 may be defined to emphasize contrast with the optical intensity of the soft key 210 as well as with the background.

Figure 3:
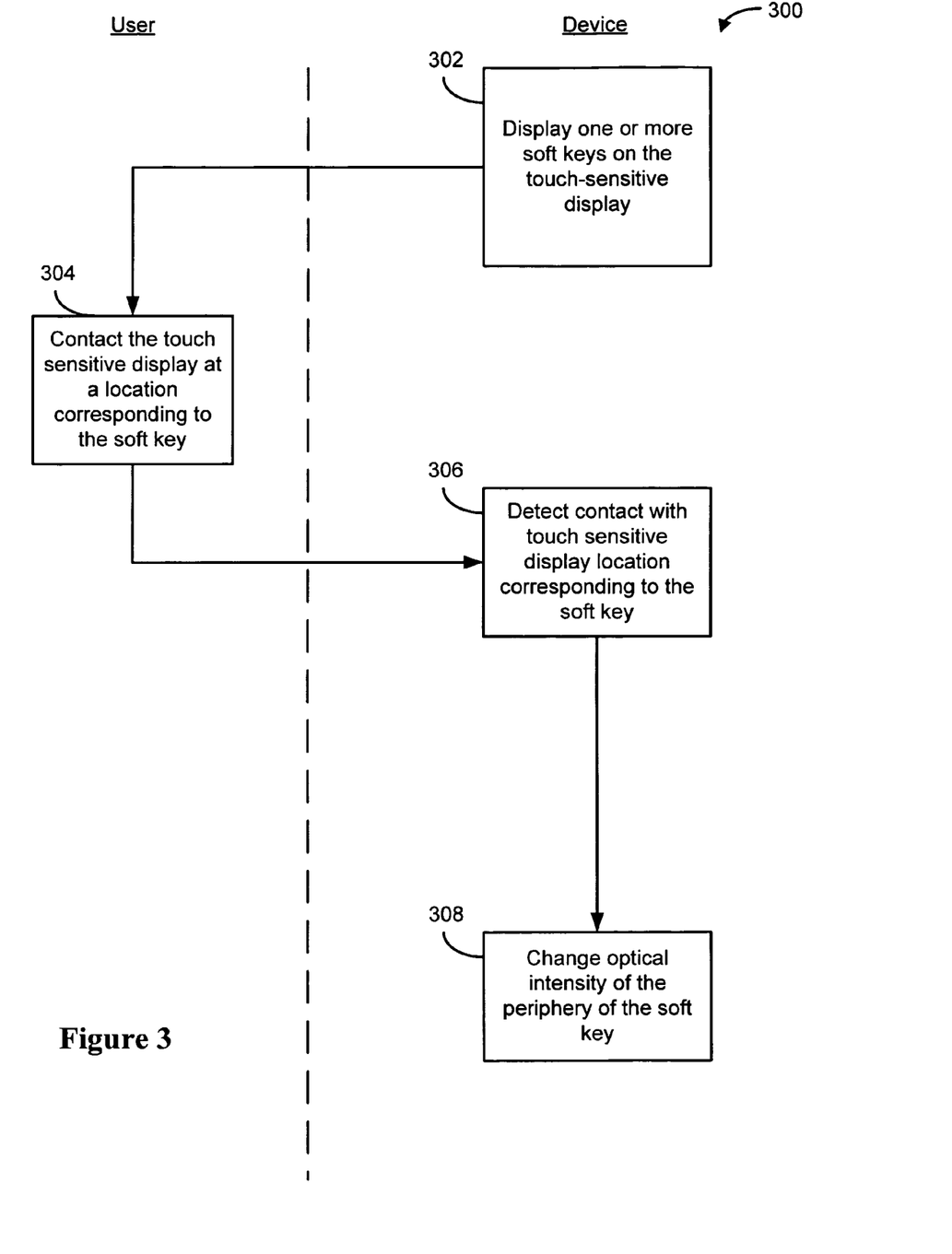
FIG. 3 is a flow diagram illustrating a process for changing the optical intensity of the periphery of a soft key, according to some embodiments of the invention.

FIG. 3 is a flow diagram illustrating a process 300 for changing the optical intensity of a periphery (such as the periphery 206 in FIG. 2) of a soft key (such as the soft key 210 in FIG. 2), according to some embodiments of the invention. One or more soft keys are displayed on the touch screen (302). Each soft key is displayed with an initial optical intensity for the periphery. In some embodiments, the initial optical intensity is the minimum optical intensity. However, the process 300 applies whether the initial optical intensity is the minimum, maximum, or anywhere in between. A user makes contact with the touch screen, the contact corresponding to interaction with one of the displayed soft keys (304). For convenience of explanation, the soft key with which the user interacts is referred to as soft key X. User contact corresponds to interaction with soft key X only if the contact is made at a location on the touch screen corresponding to the area of soft key X. In other words, the user is "pushing" the soft key. In some embodiments, the contact location may at least in part overlap the displayed perimeter of the soft key X or may be within the perimeter of the soft key X. In other embodiments, the contact location may be outside of the perimeter of the soft key X. The contact may be a touch and release (e.g., a tap) or a continuous contact, where the user makes contact at the area of soft key X and maintains the contact in place on the touch screen by holding the digit in place.

The device detects the contact that corresponds to user interaction with soft key X (306). The device changes the optical intensity of the periphery of soft key X (308). The process 300 may include fewer operations or additional operations. In addition, two or more operations may be combined and/or an order of the operations may be changed.

The change of the optical intensity may include an increase of the optical intensity from the initial optical intensity, a decrease of the optical intensity from the initial optical intensity, an increase of the optical intensity and then a decrease, a decrease and then an increase, repetitions of increases and decreases, and any combination thereof. For example, in some embodiments, the change may be increases and decreases in optical intensity that follows a periodic function, simulating a pulsing effect for the periphery. The rate of the increase or decrease may be predefined. For example, if the increase or decrease is linear, the "slope" of the increase or decrease may be defined such that the change will be perceived by users as an abrupt change or as a slower, steady change. In some embodiments, the change is a smooth, continuous change, with no human-perceptible breaks or discreteness in the change. As used in the specification and claims, a "smooth" change and "smoothly changing" mean that the time that it takes to change the optical intensity between a minimum value (e.g., zero intensity or a local minimum in a periodic function) and a maximum value (e.g., a global maximum intensity or a local maximum in a periodic function) is greater than a predefined minimum time. In some embodiments, the change may occur an order of magnitude (at least 10-100×) slower than the touch screen 202 (FIG. 2) is capable of changing or modifying a displayed optical intensity. In some embodiments, the minimum time to change between minimum and maximum optical intensity is greater than 0.2 seconds. In some embodiments, the minimum time to change between minimum and maximum optical intensity is between 0.2 and 2 seconds.

When the optical intensity is to be changed, the change is implemented in the device by adjusting the values that define the optical intensity and refreshing the display to reflect the new values. For example, if the optical intensity of an object is defined as the color and brightness of the object, a change in optical intensity is achieved by modifying the color and brightness values of the object and then refreshing the display (the display refresh may be periodic or triggered by the device in response to the changes in the color and brightness values). The graphics in the refreshed display is changed in accordance with the new values. In some embodiments, the color and/or brightness values of the object may be changed based on a logarithmic scale.

The change may be based on a function. In some embodiments, the change of the optical intensity is a function of time elapsed since the interaction with the soft key X. The change may be based on any of a wide variety of functions, including many well-known mathematical functions such as linear, sinusoidal, hyperbolic, exponential, logarithmic and/or Gaussian functions. The functions may be implemented using a table lookup or calculations of the corresponding values in real-time or near real-time. Further details of changing the optical intensity according to a function are described below, in relation to FIGS. 6A-6F.

In some embodiments, in addition to or in place of changing the optical intensity of the periphery of the soft key, the portable device provides visual feedback by changing the size of the periphery (e.g., increasing the thickness of the periphery, decreasing the thickness, or oscillating the thickness).

In some embodiments, in addition to visual feedback, the portable device supplies non-visual feedback to indicate that the soft key has been activated and/or deactivated. The additional feedback may include audible feedback (sound(s)) or physical feedback (vibration(s)).

In some applications, the soft key must be held for a predetermined time before the key is activated. For such applications, a progress indicator may be displayed on the touch screen 202 when contact is detected with the soft key. If the soft key is held for at least the predetermined time, the device can provide feedback that the soft key has been activated (e.g., by changing the optical intensity and/or size of the periphery, by making a sound, and/or by vibrating). If the soft key is not held for at least the predetermined time, the key is not activated and the progress indicator may show insufficient progress and/or disappear from the touch screen.

Figure 4:
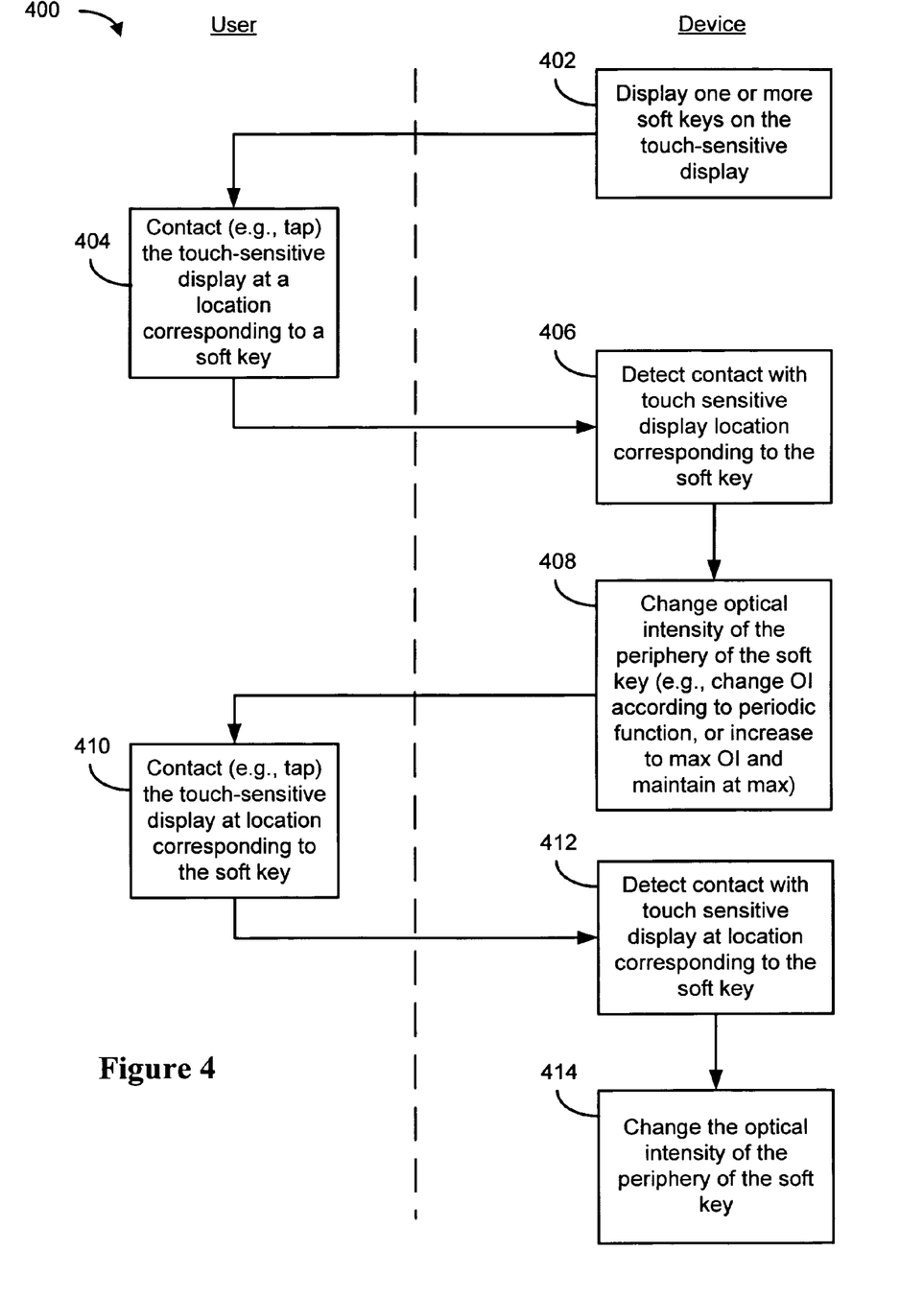
FIG. 4 is a flow diagram illustrating a process for toggling the optical intensity of the periphery of a soft key, according to some embodiments of the invention.

FIG. 4 is a flow diagram illustrating a process 400 for toggling the optical intensity of the periphery of a soft key, according to some embodiments of the invention. One or more soft keys are displayed on the touch screen (402). A user makes contact with the touch screen, the contact corresponding to interaction with one of the displayed soft keys (404). In other words, the user pushes the soft key. For example, the contact may be a tap on the touch screen. For convenience of explanation, the soft key with which the user interacts is referred to as soft key Y.

The device detects the contact that corresponds to user interaction with soft key Y (406). The optical intensity of the periphery of soft key Y is changed (408). In some embodiments, the device may change the optical intensity according to a function, further details of which are described below, in relation to FIGS. 6A-6C. In some other embodiments, the optical intensity may change to an optical intensity different from the initial intensity and remain there. For example, the optical intensity, after the detection of the contact, changes from an initial minimum intensity to the maximum and stays at the maximum as long as there is no further interaction with the soft key Y.

The user makes contact with the touch screen again, the contact corresponding to interaction with soft key Y (410). The device detects the new contact (412). The device changes the optical intensity of the periphery of soft key Y (414). The optical intensity is changed back to the initial intensity and remains at the initial intensity until the next interaction with the soft key. In some embodiments, the change includes halting the changing of the optical intensity according to the function and returning the soft key Y to the initial optical intensity. The process 400 may include fewer operations or additional operations. In addition, two or more operations may be combined and/or an order of the operations may be changed.

In process 400, interacting with the soft key Y by "pushing" the soft key Y toggles the change in optical intensity. In some embodiments, the toggle may be between the initial optical intensity and another optical intensity level. In some other embodiments, the toggle may be between the initial optical intensity and a continuous change in the optical intensity according to a function. This toggle effect may be used to indicate toggling of a function on the device by interaction with a toggle soft key.

For example, a soft key that activates or deactivates a speakerphone function on the device may use this toggle effect. The speakerphone soft key may be displayed with the minimum optical intensity as the initial optical intensity to indicate that the speakerphone function is not active. A push of the speakerphone soft key by a user activates the speakerphone function and triggers, as an indication that the speakerphone function is active, a change of the optical intensity to the maximum (and the optical intensity stays at the maximum) or a continuous increase and decrease of the optical intensity that may be perceived by the user as a pulsing effect. A second push of the speakerphone soft key deactivates the speakerphone function and returns the optical intensity to the minimum and the optical intensity will remain at the minimum until the speakerphone soft key is pushed again. Further details of the toggle effect are described below, in relation in FIGS. 6A-6C.

Figure 5:
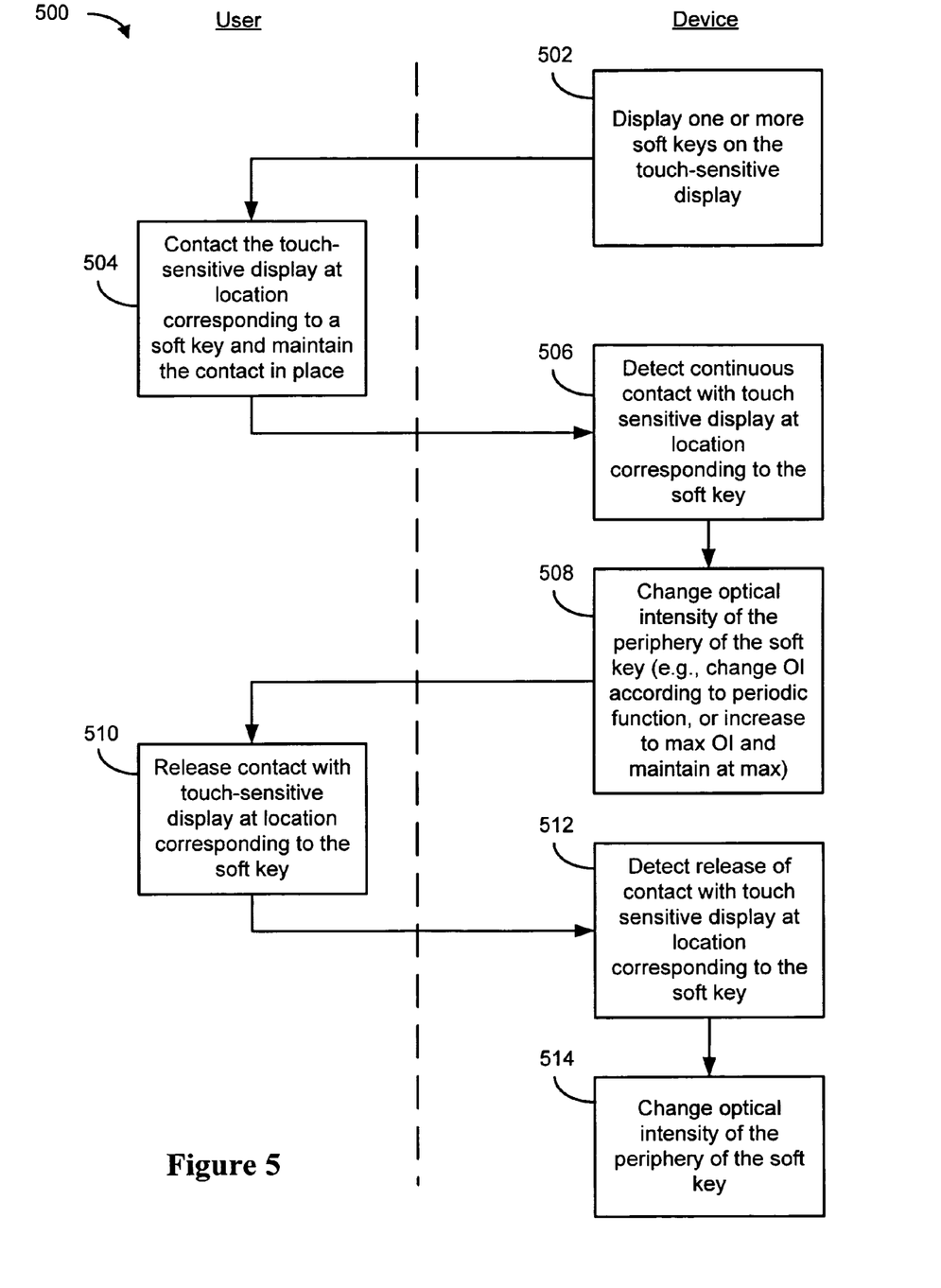
FIG. 5 is a flow diagram illustrating a process for changing the optical intensity of the periphery of a soft key in response to continuous contact with the touch screen, according to some embodiments of the invention.

FIG. 5 is a flow diagram illustrating a process 500 for changing the optical intensity of the periphery of a soft key in response to continuous contact with the touch screen, according to some embodiments of the invention. One or more soft keys are displayed on the touch screen (502). A user makes contact with the touch screen and holds the contact in place, the contact corresponding to interaction with one of the displayed soft keys (504). In other words, the user makes and maintains continuous contact with the touch screen at an area corresponding to the soft key; the user is holding (or "holding down") the soft key. For convenience of explanation, the soft key the user holds down is referred to as soft key Z.

The continuous contact is detected by the device (506). Upon detection of the continuous contact, the optical intensity of the periphery of soft key Z is changed (508). In some embodiments, the device may change the optical intensity according to a function as long as the continuous contact is not released, further details of which are described below in relation to FIGS. 6D-6F. In some other embodiments, the optical intensity may change to an optical intensity different from the initial intensity and remain there as long as the continuous contact is not released. For example, the optical intensity, after the detection of the contact, changes from an initial minimum intensity to the maximum intensity and stays at the maximum intensity as long as the soft key Z is held down.

The user removes the contact from the touch screen (510). The release of the continuous contact is detected (512). The optical intensity is changed back to the initial intensity (514). The optical intensity is changed back to the initial intensity and remains at the initial intensity until the next interaction with the soft key Z. In some embodiments, the change includes halting the changing of the optical intensity according to the function and returning the soft key Z to the initial optical intensity. The process 500 may include fewer operations or additional operations. In addition, two or more operations may be combined and/or an order of the operations may be changed.

In the process 500, interacting with the soft key Z by holding the soft key Z triggers the change in optical intensity. In embodiments where the change occurs according to a function, the change continues as long as the continuous contact is not released (i.e., as long as the soft key Z remains held). In embodiments where the optical intensity is changed to an intensity different from the initial one and remains there, the optical intensity remains there as long as the soft key Z remains held, i.e., as long as the contact is maintained. Once the continuous contact is released (i.e., the soft key Z is released), the optical intensity returns to the initial intensity. Further details of the change in optical intensity in response to holding down soft key Z are described below, in relation in FIGS. 6D-6F.

Figure 6A:
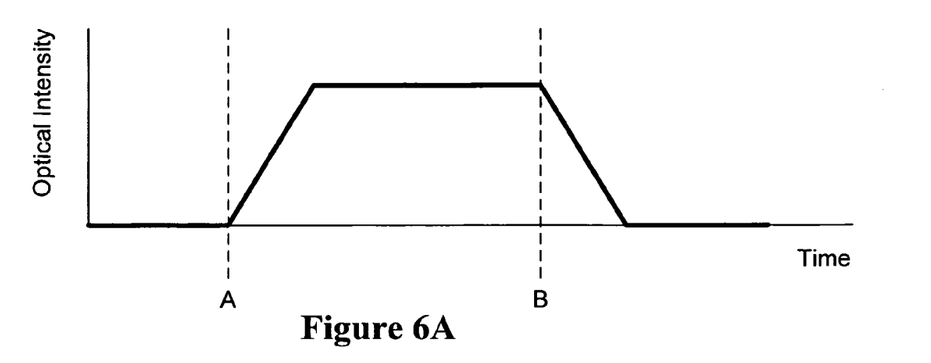
FIGS. 6A-6F are graphs illustrating changes in the optical intensity of a soft key, over time, according to some embodiments of the invention.
Figure 6B:
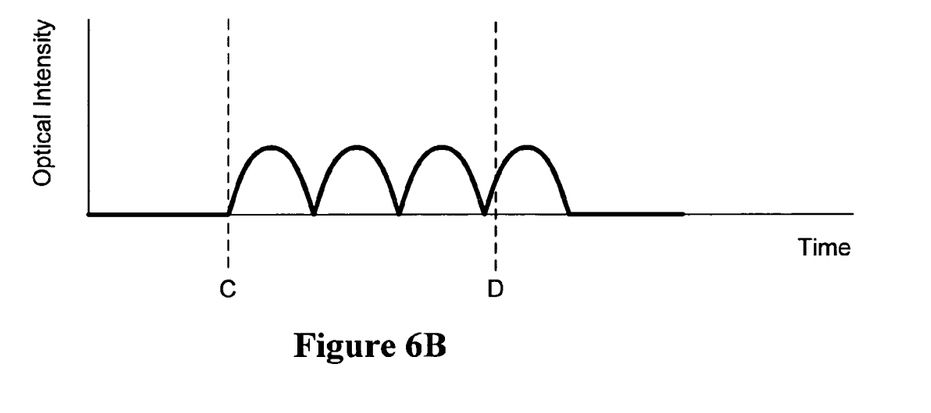
Figure 6C:
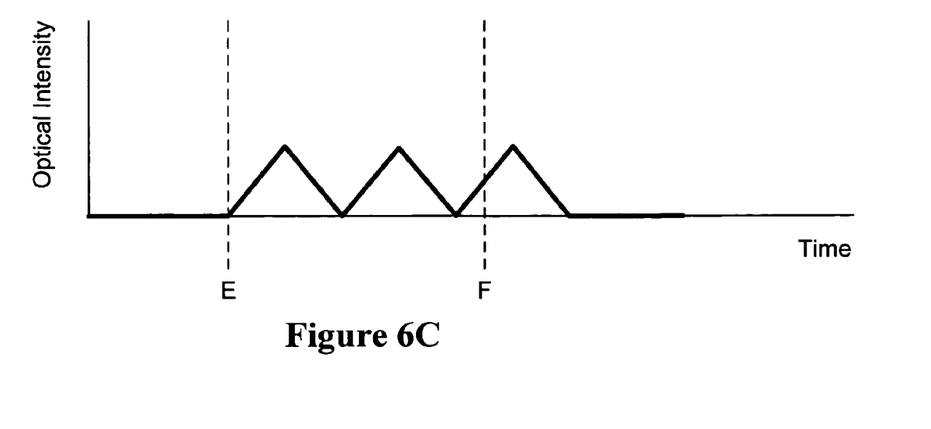
Figure 6D:
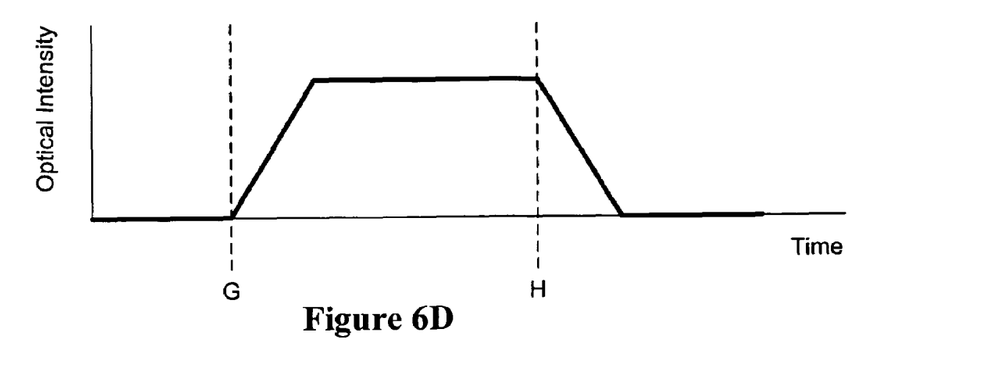
Figure 6E:
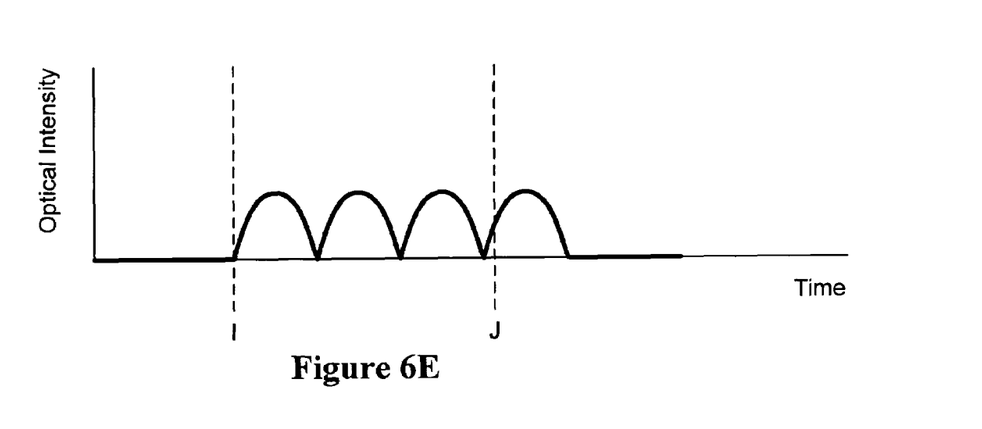
Figure 6F:
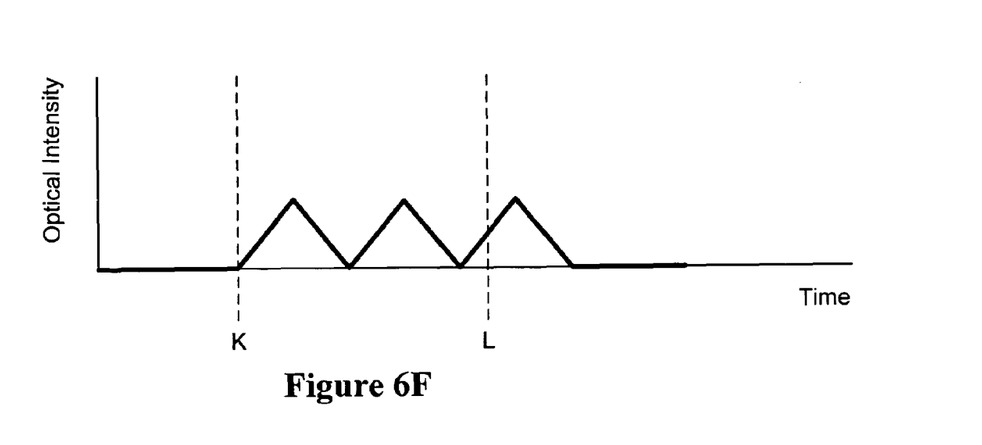

Attention is now directed towards embodiments of functions and waveforms with which an optical intensity of the periphery of one or more soft keys may be adjusted. FIGS. 6A-6F are graphs illustrating changes in optical intensity of a soft key, over time, in response to interaction with the soft key, according to some embodiments of the invention. FIGS. 6A-6C illustrate changes in optical intensity that are based on a toggle. FIGS. 6D-6F illustrate changes in optical intensity that are based on holding a soft key. It should be appreciated that these graphs are not to scale.

In FIG. 6A, the initial optical intensity of the soft key is at the minimum. At time A, a user pushes the soft key. The push is detected by the device and the optical intensity changes to the maximum and stays at the maximum in response to the push. At time B, the user pushes the soft key again. The second push is detected by the device and the optical intensity changes back to the initial minimum in response. In some embodiments, the minimum time to change between minimum and maximum optical intensity in FIG. 6A is greater than 0.2 seconds. In some embodiments, the minimum time to change between minimum and maximum optical intensity in FIG. 6A is between 0.2 and 2 seconds.

In FIG. 6B, the initial optical intensity of the soft key is at the minimum. At time C, a user pushes the soft key. The push is detected by the device and the optical intensity increases to the maximum and decreases to the minimum according to a function. In FIG. 6B, the function is the absolute value of a sinusoidal function of time. It should be appreciated that the same change may be graphed as a sinusoidal function of time, without the absolute value; the "negative" portions of the curve are treated the same as the "positive" portions. At time D, the user pushes the soft key again. The push is detected and optical intensity changes back to the initial minimum in response. The optical intensity does not abruptly change to the initial minimum after the second push; the optical intensity returns to the minimum according to the function, maintaining a smooth and continuous effect. In some embodiments, a maximum fundamental frequency of the periodic portion of the function illustrated in FIG. 6B is from 0.25 to 2.5 Hz.

In FIG. 6C, the initial optical intensity of the soft key is at the minimum. At time E, a user pushes the soft key. The push is detected and the optical intensity increases to the maximum and decreases to the minimum according to a function. In FIG. 6C, the function is a periodic function in which the intensity increases linearly to the maximum, then decreases linearly to the minimum, and this period of increase and decrease repeats. At-time F, the user pushes the soft key again. The push is detected and the optical intensity changes back to the initial minimum in response by following the function. In some embodiments, a maximum fundamental frequency of the periodic portion of the function illustrated in FIG. 6C is from 0.25 to 2.5 Hz.

In FIG. 6D, the initial optical intensity of the soft key is at the minimum. At time G, a user pushes and holds the soft key. The hold is detected by the device and the optical intensity increases to the maximum in response. The optical intensity stays at the maximum as long as the soft key remains held. At time H, the soft key is released. The release is detected and the optical intensity decreases back to the minimum. In some embodiments, the minimum time to change between minimum and maximum optical intensity in FIG. 6D is greater than 0.2 seconds. In some embodiments, the minimum time to change between minimum and maximum optical intensity in FIG. 6D is between 0.2 and 2 seconds.

In FIG. 6E, the initial optical intensity of the soft key is at the minimum. At time I, a user pushes and holds the soft key. The hold is detected by the device and the optical intensity increases and decreases according to the absolute value of a sinusoidal function. The optical intensity keeps changing according to the function as long as the soft key remains held. At time J, the soft key is released. The release is detected and the optical intensity decreases back to the minimum and it ceases changing according to the function. In some embodiments, a maximum fundamental frequency of the periodic portion of the function illustrated in FIG. 6E is from 0.25 to 2.5 Hz.

In FIG. 6F, the initial optical intensity of the soft key is at the minimum. At time K, a user pushes and holds the soft key. The hold is detected by the device and the optical intensity changes in response, according to the periodic linear increase—linear decrease function similar to that of FIG. 6C. The optical intensity keeps changing according to the function as long as the soft key remains held. At time L, the soft key is released. The release is detected and the optical intensity decreases back to the minimum. In some embodiments, a maximum fundamental frequency of the periodic portion of the function illustrated in FIG. 6F is from 0.25 to 2.5 Hz.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of indicating interaction on a device comprising a touch-sensitive display, comprising:
   displaying a soft key on the touch-sensitive display;
   detecting contact with the touch-sensitive display corresponding to interaction with the soft key;
   in response to detecting the contact, controlling a change in optical intensity of a periphery of the soft key in accordance with a predefined mathematical function, wherein the predefined mathematical function is a periodic function;
   in response to detecting a release of the contact, determining whether the optical intensity of the periphery is at a minimum optical intensity; and
   when the optical intensity of the periphery is not at the minimum optical intensity, returning the optical intensity of the periphery to the minimum optical intensity according to the predefined mathematical function.

2. A method of indicating interaction on a device comprising a touch-sensitive display, comprising:
   displaying a soft key on the touch-sensitive display;
   detecting contact with the touch-sensitive display corresponding to interaction with the soft key; and
   in response to detecting the contact, controlling a change in optical intensity of a periphery of the soft key in accordance with a predefined mathematical function, wherein:
      the predefined mathematical function is a periodic function, and
      controlling the change in optical intensity of the periphery of the soft key includes changing the optical intensity between a minimum optical intensity and a maximum optical intensity, with a fundamental frequency of the periodic function between 0.25 hertz -2.5 hertz.

3. A method of indicating interaction on a device comprising a touch-sensitive display, comprising:
   displaying a soft key on the touch-sensitive display;
   detecting contact with the touch-sensitive display corresponding to interaction with the soft key;

in response to detecting the contact, controlling a change in optical intensity of a periphery of the soft key in accordance with a predefined mathematical function, wherein controlling the change in optical intensity of the periphery includes changing the optical intensity between a minimum optical intensity and a maximum optical intensity, and a minimum time to change between the minimum optical intensity and the maximum optical intensity is greater than 0.2 seconds and less than 2 seconds.

4. A method of indicating interaction on a device comprising a touch-sensitive display, comprising:
displaying a soft key on the touch-sensitive display;
detecting contact with the touch-sensitive display corresponding to interaction with the soft key;
in response to detecting the contact, controlling a change in optical intensity of a periphery of the soft key in accordance with a predefined mathematical function;
in response to detecting the contact, displaying a progress indicator, wherein the progress indicator is indicative of a predetermined time period until a soft key activation event; and
activating the soft key if contact is maintained on the soft key for the predetermined time period, and not activating the soft key if contact is not maintained on the soft key for the predetermined time period.

5. A portable electronic device, comprising:
a touch-sensitive display;
memory;
one or more processors; and
one or more modules stored in the memory and configured for execution by the one or more processors, the one or more modules comprising instructions for:
displaying a soft key on the touch-sensitive display;
detecting contact with the touch-sensitive display corresponding to interaction with the soft key;
in response to detecting the contact, controlling a change in optical intensity of a periphery of the soft key in accordance with a predefined mathematical function, wherein the predefined mathematical function is a periodic function;
in response to detecting a release of the contact, determining whether the optical intensity of the periphery is at a minimum optical intensity; and,
when the optical intensity of the periphery is not at the minimum optical intensity, returning the optical intensity of the periphery to the minimum optical intensity according to the predefined mathematical function.

6. A computer readable storage medium storing one or more programs, the one or more programs comprising instructions, which when executed by a portable electronic device with a touch-sensitive display, cause the device to:
display a soft key on the touch-sensitive display;
detect contact with the touch-sensitive display corresponding to interaction with the soft key;
in response to detecting the contact, control a change in optical intensity of a periphery of the soft key in accordance with a predefined mathematical function, wherein the predefined mathematical function is a periodic function;
in response to detecting a release of the contact, determine whether the optical intensity of the periphery is at a minimum optical intensity; and,
when the optical intensity of the periphery is not at the minimum optical intensity, return the optical intensity of the periphery to the minimum optical intensity according to the predefined mathematical function.

7. A portable electronic device, comprising:
a touch-sensitive display;
memory;
one or more processors; and
one or more modules stored in the memory and configured for execution by the one or more processors, the one or more modules comprising instructions for:
displaying a soft key on the touch-sensitive display;
detecting contact with the touch-sensitive display corresponding to interaction with the soft key; and
in response to detecting the contact, controlling a change in optical intensity of a periphery of the soft key in accordance with a predefined mathematical function in response to detection of the contact, wherein:
the predefined mathematical function is a periodic function, and
controlling the change in optical intensity of the periphery of the soft key includes changing the optical intensity between a minimum optical intensity and a maximum optical intensity, with a fundamental frequency of the periodic function between 0.25 hertz-2.5 hertz.

8. A computer readable storage medium storing one or more programs, the one or more programs comprising instructions, which when executed by a portable electronic device with a touch-sensitive display, cause the device to:
display a soft key on the touch-sensitive display;
detect contact with the touch-sensitive display corresponding to interaction with the soft key; and
in response to detecting the contact, control a change in optical intensity of a periphery of the soft key in accordance with a predefined mathematical function, wherein:
the predefined mathematical function is a periodic function, and
controlling the change in optical intensity of the periphery of the soft key includes changing the optical intensity between a minimum optical intensity and a maximum optical intensity, with a fundamental frequency of the periodic function between 0.25 hertz-2.5 hertz.

9. A portable electronic device, comprising:
a touch-sensitive display;
memory;
one or more processors; and
one or more modules stored in the memory and configured for execution by the one or more processors, the one or more modules comprising instructions for:
displaying a soft key on the touch-sensitive display;
detecting contact with the touch-sensitive display corresponding to interaction with the soft key; and
in response to detecting the contact, controlling a change in optical intensity of a periphery of the soft key in accordance with a predefined mathematical function in response to detection of the contact, wherein controlling the change in optical intensity of the periphery includes changing the optical intensity between a minimum optical intensity and a maximum optical intensity, and a minimum time to change between the minimum optical intensity and the maximum optical intensity is greater than 0.2 seconds and less than 2 seconds.

10. A computer readable storage medium storing one or more programs, the one or more programs comprising instructions, which when executed by a portable electronic device with a touch-sensitive display, cause the device to:

display a soft key on the touch-sensitive display;
detect contact with the touch-sensitive display corresponding to interaction with the soft key; and
in response to detecting the contact, control a change in optical intensity of a periphery of the soft key in accordance with a predefined mathematical function, wherein controlling the change in optical intensity of the periphery includes changing the optical intensity between a minimum optical intensity and a maximum optical intensity, and a minimum time to change between the minimum optical intensity and the maximum optical intensity is greater than 0.2 seconds and less than 2 seconds.

11. A portable electronic device, comprising:
a touch-sensitive display;
memory;
one or more processors; and
one or more modules stored in the memory and configured for execution by the one or more processors, the one or more modules comprising instructions for:
   displaying a soft key on the touch-sensitive display;
   detecting contact with the touch-sensitive display corresponding to interaction with the soft key;
   in response to detecting the contact:
      controlling a change in optical intensity of a periphery of the soft key in accordance with a predefined mathematical function; and
      displaying a progress indicator, wherein the progress indicator is indicative of a predetermined time period until a soft key activation event; and
   activating the soft key if contact is maintained on the soft key for the predetermined time period, and not activating the soft key if contact is not maintained on the soft key for the predetermined time period.

12. A computer readable storage medium storing one or more programs, the one or more programs comprising instructions, which when executed by a portable electronic device with a touch-sensitive display, cause the device to:
   display a soft key on the touch-sensitive display;
   detect contact with the touch-sensitive display corresponding to interaction with the soft key;
   in response to detecting the contact:
      control a change in optical intensity of a periphery of the soft key in accordance with a predefined mathematical function; and
      display a progress indicator, wherein the progress indicator is indicative of a predetermined time period until a soft key activation event; and
   activate the soft key if contact is maintained on the soft key for the predetermined time period, and not activate the soft key if contact is not maintained on the soft key for the predetermined time period.

* * * * *

UNITED STATES PATENT AND TRADEMARK OFFICE
CERTIFICATE OF CORRECTION

PATENT NO. : 7,649,526 B2  Page 1 of 1
APPLICATION NO. : 11/322548
DATED : January 19, 2010
INVENTOR(S) : Bas Ording et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1018 days.

In column 11, line 43, delete "At-time" and insert -- At time --, therefor.

Signed and Sealed this

Fourteenth Day of September, 2010

David J. Kappos
*Director of the United States Patent and Trademark Office*